Figure 1:
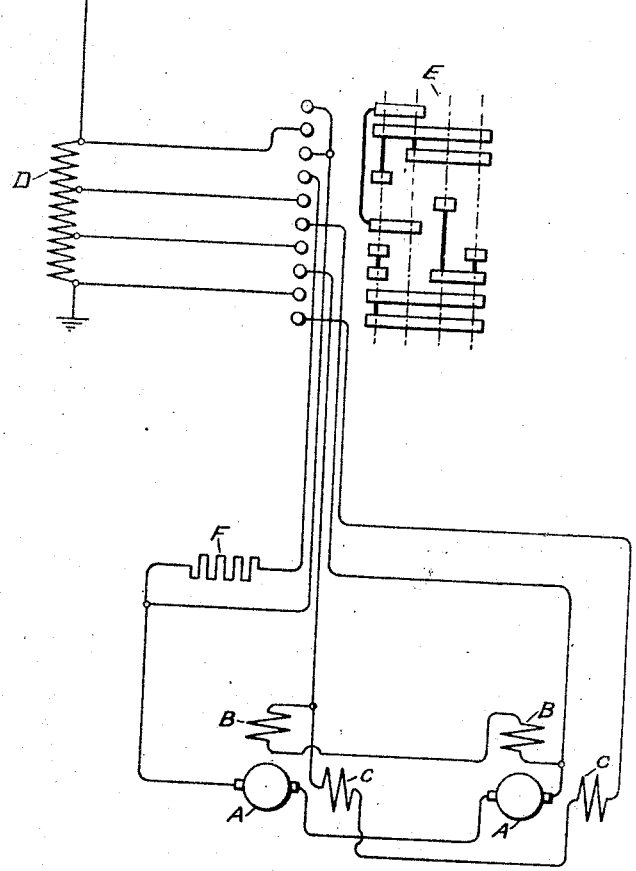

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE-MOTOR CONTROL.

949,346. Specification of Letters Patent. Patented Feb. 15, 1910.

Application filed October 31, 1907. Serial No. 400,102.

To all whom it may concern:

Be it known that I, ERNST F. W. ALEXANDERSON, a citizen of the United States, residing at Schenectady, county of Schenectady, State of New York, have invented certain new and useful Improvements in Single-Phase-Motor Control, of which the following is a specification.

My invention relates to the control of single-phase motors of the commutator type, and consists in an improvement in the method of control described in my former application, Serial No. 383,807, filed July 15, 1907.

In my former application I pointed out the fact that in what is known as the repulsion motor, in which the armature is short-circuited, there exists an inducing field which for low speeds has a good effect on commutation, since the electromotive force induced in the short-circuited coils by cutting this field opposes the electromotive force due to the transformer action of the exciting, or cross-field; but that at high speeds this electromotive force due to cutting the inducing field becomes excessive. I, accordingly, disclosed a control system in which, for low speeds, the armature is short-circuited, while at higher speeds an electromotive force is introduced into the armature circuit, which reduces the strength of the inducing field, and also the exciting winding is introduced into the armature circuit in order to produce leakage fields which tend to neutralize the commutation reactance. My present invention is particularly applicable to a control system of this general character, and has particular reference to the starting connections. At the instant of starting, although the inducing field exists, there is no electromotive force induced by it in the short-circuited coils, since the rate of cutting this field is zero. The electromotive force induced by the transformer action of the exciting field is a maximum, and since it is unopposed, it produces at the instant of starting heavy currents in the armature coils short-circuited by the brushes. These heavy currents not only tend to produce sparking at starting, but further react upon the exciting field which produces them, distorting the phase of this field so that it is no longer in phase with the motor current. This results in reducing the starting torque of the motor.

In an application, Serial No. 392,632, filed by G. H. Hill, September 13, 1907, and assigned to the General Electric Company, a starting connection for single-phase commutator motors is described, in which a definite voltage is impressed on the terminals of the field or exciting winding by placing it in shunt to the other windings. By fixing the amount and phase of the terminal voltage impressed on the exciting winding, the amount and phase of the exciting flux is positively fixed, and although this flux lags nearly ninety degrees behind the impressed voltage, the currents in inducing and armature windings in the case of a repulsion motor, or in the compensating and armature windings in the case of a series motor, also lag at the moment of starting nearly ninety degrees behind the impressed voltage, so that the exciting flux at starting is substantially in phase with the motor current. As soon as the motor starts, the phase of the motor currents is advanced by the counter-electromotive force induced by rotation. Therefore, when the connection described by Mr. Hill is employed at starting, it can be maintained only momentarily.

My invention in one aspect consists not only in fixing the amount and phase of the terminal voltage of the exciting winding at starting, but further fixing its phase slightly in advance of the voltage impressed on the other motor windings. This may conveniently be accomplished by placing a non-inductive resistance in series with the exciting winding, and then connecting the exciting circuit in shunt to the main motor circuit. This connection results in producing an exciting flux which at the moment of starting is somewhat in advance of the motor currents, so that as the motor starts and the motor currents come more nearly into phase with the motor terminal voltage they are first brought into phase with the exciting flux, and then get in advance of it. There results an appreciable range of speed over which the motor currents are nearly in phase with the exciting flux, so that the fixed voltage may be maintained on the exciting winding until the speed of the motor has become high enough to produce in the armature coil short-circuited by the brushes an appreciable voltage due to cutting the inducing field. In other words, the starting connections may be longer maintained, so that the commutation immediately after changing to the accelerating connections is better than when the simple shunt connection of the exciting winding is employed at starting.

My invention further comprises inserting in the armature short-circuit at starting a voltage reversed in phase with respect to the voltage which is impressed on the armature for high speeds. This reverse voltage strengthens the inducing field, and consequently assist commutation.

My invention will best be understood by reference to the accompanying drawings, in which—

Figure 1 shows a pair of motors arranged for control in accordance with my invention; Figs. 2 to 5 are diagrams of the circuit connections established by the controlling switch of Fig. 1 in its several positions, only a single motor being shown, to avoid complicating the diagrams; and Fig. 6 shows a modified arrangement of the starting connections.

In Fig. 1, A A represent the armatures, B B the exciting windings, and C C the inducing windings of a pair of single-phase motors of the commutator type. The windings C C, which act as inducing windings for repulsion motor operation, would commonly be termed the compensating windings in series motor operation, but to avoid unnecessary words, I shall simply term these windings "inducing windings" with the understanding that the term applies both to repulsion and to compensated series motors, and designates the winding which produces a magneto-motive force in line with that of the armature. D represents a transformer winding, or other suitable source of current for the motors. E represents a controlling switch, and F a non-inductive resistance.

Figure 2:
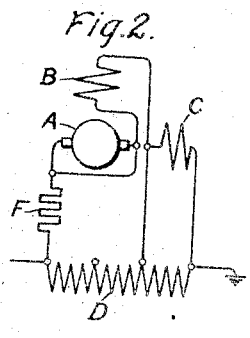

With the controlling switch E in its first position, as indicated by the first dotted line, connections are established which are shown for a single motor in Fig. 2, with the controlling switch omitted. The armature A is short-circuited, while the exciting winding B and inducing winding C are connected in parallel with the non-inductive resistance F in series with the exciting winding. The effect of the non-inductive resistance in the exciting circuit is to advance the phase of the voltage at the terminals of the exciting winding with respect to the voltage of transformer D. Therefore, although the current in the exciting winding B lags nearly ninety degrees behind its terminal voltage, this current is in advance of the current of the inducing winding, since at starting the current in the inducing winding also lags nearly ninety degrees behind its terminal voltage. Therefore, the exciting flux at the instant of starting is somewhat in advance of the current in the inducing winding and of the current in the armature A, which is substantially in phase with the current in the inducing winding. This phase-displacement, however, is not sufficient materially to reduce the starting torque, and as soon as the armature starts the resulting counter-electromotive force advances the phase of the currents in armature and inducing windings, so as to bring them first into phase with, and then in advance of, the exciting flux. If the non-inductive resistance F is properly proportioned, there is an appreciable range of speed over which the exciting flux and the currents in the other windings are substantially in phase, so that the controlling switch need not be shifted from its starting position until the motor has reached an appreciable speed.

Figure 3:
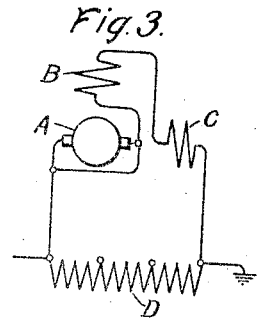

In its second position controlling switch E establishes the connections shown in Fig. 3, which are the ordinary repulsion motor connections with the armature A short-circuited and with the exciting and inducing windings in series, so that the current in the exciting winding is in phase with the currents in the other windings. This connection may be employed for acceleration or low-speed operation, and is the same connection which in my earlier application, above referred to, was employed both for starting and for low-speed operation or acceleration.

Figure 4:
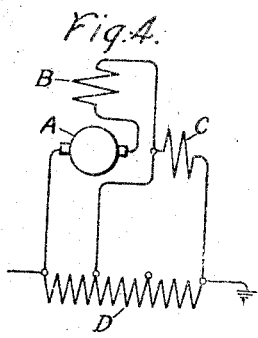

When the controlling switch E, of Fig. 1, is moved to its third position, the connections shown in Fig. 4 are established. In this figure the exciting winding B is included in the armature circuit, and a small voltage is also included in this circuit. As explained in my earlier application, the purpose of including the exciting winding in the armature circuit is to introduce leakage fields into the motor, which assist in neutralizing commutation reactance, while the purpose of the voltage introduced into the armature circuit is to reduce the inducing flux, which becomes excessive at high speeds.

Figure 5:
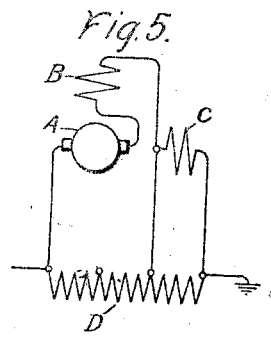
Figure 6:
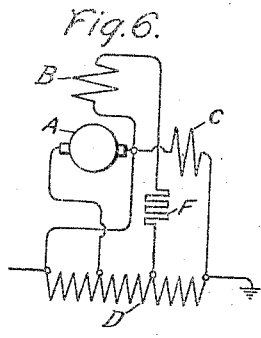

In passing from its third to its fourth position, switch E simply increases the voltage impressed on the armature circuit, as shown in Fig. 5, so that the inducing field is further weakened. The connections of Figs. 3, 4 and 5 are the same as the connections disclosed in my earlier application.

While the effect on commutation of the inducing field becomes excessive above synchronism, if the armature is left short-circuited, at low speeds it is too weak, when the armature is short-circuited, as in Fig. 2, to neutralize the electromotive forces due to the transformer action of the exciting field. Just as the inducing field may be weakened by inserting in the armature circuit a voltage of a certain phase, so also it may be strengthened by a voltage of the opposite phase. Such an arrangement is shown in Fig. 6, which is the same as Fig. 2, except that the armature, instead of being directly short-circuited, has impressed on it a voltage of opposite phase with respect to the voltage which is included in the armature circuit for high-speed operation. The effect of the connection shown in Fig. 6 is to increase the strength of the inducing field and to improve the commutation at low speeds; and in the control above described, the connections of Fig. 6 may be substituted for those of Fig. 2.

Since the starting connections of either Fig. 2 or Fig. 6 would tend to produce braking at high speeds, it will generally be advisable to arrange the controller to skip the starting connections on returning from full speed to off position. This arrangement may be brought about in several ways, as, for instance, by the contact construction shown in Patent No. 798,375, issued to H. E. White, August 29, 1905.

What I claim as new and desire to secure by Letters Patent of the United States, is:

1. The method of operating a single-phase motor of the commutator type, which consists in impressing on the terminals of the exciting winding at starting a voltage fixed in amount and phase and in advance of the terminal voltage of the other windings, and as soon as the motor has started supplying to the exciting winding a current in phase with the currents of the other motor windings.

2. The method of operating a single-phase motor of the commutator type, which consists in connecting a non-inductive resistance in series with the exciting winding at starting and impressing a shunt voltage on the exciting circuit, and as soon as the motor has started connecting the exciting winding in series with the other motor windings.

3. The method of starting a single-phase motor of the commutator type having inducing and exciting windings on the stator, which consists in connecting the armature in a local closed circuit and connecting the inducing and exciting windings in shunt to each other with a non-inductive resistance in series with the exciting winding.

4. The method of operating a single-phase motor of the commutator type having inducing and exciting windings on the stator, which consists at starting in connecting the armature in a local closed circuit and the inducing and exciting windings in shunt to each other, and as soon as the motor has started connecting the exciting windings in series with one of the other windings.

5. The method of operating a single-phase motor of the commutator type having inducing and exciting windings on the stator, which consists at starting in connecting the armature in a local closed circuit and the inducing and exciting windings in shunt to each other with a non-inductive resistance in series with the exciting winding, and as soon as the motor has started connecting the exciting winding in series with one of the other windings.

6. The method of starting a single-phase motor of the commutator type having inducing and exciting windings on the stator, which consists in connecting the armature in a local closed circuit with a source of voltage and connecting the inducing and exciting windings in shunt to each other with a non-inductive resistance in series with the exciting winding.

7. The method of operating a single-phase motor of the commutator type having inducing and exciting windings on the stator, which consists at starting in connecting the armature in a local closed circuit with a source of voltage and connecting the inducing and exciting windings in shunt to each other, and as soon as the motor has started connecting the exciting winding in series with one of the other windings.

8. The method of operating a single-phase motor of the commutator type having inducing and exciting windings on the stator, which consists at starting in connecting the armature in a local closed circuit with a source of voltage and connecting the inducing and exciting windings in shunt to each other with a non-inductive resistance in series with the exciting winding, and as soon as the motor has started connecting the exciting winding in a series with one of the other windings.

9. The method of operating a single-phase motor of the commutator type having inducing and exciting windings on the stator, which consists in connecting the armature in a local closed circuit and connecting the inducing and exciting windings in shunt for starting, connecting the inducing and exciting windings in series for accelerating, and connecting the exciting winding in a local closed circuit with the armature and with a source of voltage for running.

10. The method of operating a single-phase motor of the commutator type having inducing and exciting windings on the stator, which consists in connecting the armature in a local closed circuit and connecting the inducing and exciting windings in shunt to each other with a non-inductive resistance in series with the exciting winding for starting, connecting the inducing and exciting windings in series for accelerating, and connecting the exciting winding in a local closed circuit with the armature and with a source of voltage for running.

11. The method of operating a single-phase motor of the commutator type having inducing and exciting windings on the stator which consists in connecting the armature in a local closed circuit with a source of voltage at starting, and for running including the exciting winding in the closed circuit and reversing the phase of said voltage.

12. In combination, a single-phase motor of the commutator type, a source of voltage therefor, a non-inductive resistance, and a controlling switch arranged to connect said resistance in series with the exciting winding and to connect the exciting circuit to the source in shunt to the main motor circuit at starting, and in a subsequent position to connect the exciting winding in series with the other motor windings.

13. In combination, a single-phase motor of the commutator type having inducing and exciting windings on the stator, and a controlling switch arranged in its starting position to connect the motor armature in a local closed circuit and to connect the inducing and exciting windings in shunt to each other, and in a subsequent position to connect the exciting winding in series with one of the other motor windings.

14. In combination, a single-phase motor of the commutator type having inducing and exciting windings on the stator, a non-inductive resistance, and a controlling switch arranged in its starting position to connect the motor armature in a local closed circuit and to connect the exciting winding in series with the resistance and in shunt to the inducing winding.

15. In combination, a single-phase motor of the commutator type having inducing and exciting windings on the stator, a non-inductive resistance, and a controlling switch arranged in its starting position to connect the exciting winding in series with the resistance and in shunt to the inducing winding, and in a subsequent position to connect the exciting winding in series with one of the other motor windings.

16. In combination, a single-phase motor of the commutator type having inducing and exciting windings on the stator, a non-inductive resistance, and means for establishing a local closed circuit for the armature and impressing a voltage on the armature terminals and connecting the exciting winding in series with the resistance and in shunt to the inducing winding at starting.

17. In combination, a single-phase motor of the commutator type having inducing and exciting windings on the stator, and a controlling switch arranged in its first position to connect the armature in a local closed circuit and to connect the inducing and exciting windings in parallel, in a subsequent position to connect the inducing and exciting windings in series, and in a still subsequent position to include the exciting winding in the armature circuit and to impress a voltage thereon.

18. In combination, a single-phase motor of the commutator type having inducing and exciting windings on the stator, a non-inductive resistance, and a controlling switch arranged in its first position to connect the armature in a local closed circuit and to connect the exciting winding in series with the resistance and in shunt to the inducing winding, in a subsequent position to connect the inducing and exciting windings in series, and in a still subsequent position to include the exciting winding in the armature circuit and to impress a voltage thereon.

19. In combination, a single-phase motor of the commutator type having inducing and exciting windings on the stator, and means for establishing a local closed circuit for the armature and impressing a voltage on the armature terminals at starting and for including the exciting winding in said circuit and reversing the phase of said voltage for running.

In witness whereof, I have hereunto set my hand this 29th day of October, 1907.

ERNST F. W. ALEXANDERSON.

Witnesses:
BENJAMIN B. HULL,
HELEN ORFORD.